No. 730,940. PATENTED JUNE 16, 1903.
H. B. MARTIN.
APPARATUS FOR BAILING OIL WELLS.
APPLICATION FILED NOV. 6, 1902.
NO MODEL. 2 SHEETS—SHEET 1.

Witnesses:
A. W. Macomber
J. F. Callan

Inventor:
Henry B. Martin,
by his Attorneys
Macomber & Ellis

No. 730,940. PATENTED JUNE 16, 1903.
H. B. MARTIN.
APPARATUS FOR BAILING OIL WELLS.
APPLICATION FILED NOV. 6, 1902.
NO MODEL. 2 SHEETS—SHEET 2.

Witnesses:
Edward C. Rischman
D. B. Tuttle

Inventor:
Henry B. Martin
by his Attorneys,
Macomber & Ellis

No. 730,940. Patented June 16, 1903.

UNITED STATES PATENT OFFICE.

HENRY B. MARTIN, OF BUFFALO, NEW YORK.

APPARATUS FOR BAILING OIL-WELLS.

SPECIFICATION forming part of Letters Patent No. 730,940, dated June 16, 1903.

Application filed November 6, 1902. Serial No. 130,252. (No model.)

*To all whom it may concern:*

Be it known that I, HENRY B. MARTIN, of Buffalo, county of Erie, and State of New York, have invented certain new and useful Improvements in Apparatus for Bailing Oil-Wells, of which the following is a specification, reference being had to the accompanying drawings.

My invention relates to apparatus for bailing oil-wells.

More especially, my invention relates to certain improved apparatus and combinations of mechanisms whereby a plurality of oil-wells in a given field may all be bailed by a single source of power, and whereby the application of such source of power may be controlled from the well being bailed, and also whereby the fall of the "bailer" may be broken or stopped, and also whereby a continuously operative source of power may be applied or removed, all by the hand of the operator at any given well being bailed.

It will at once be understood by one skilled in the art that it is desirable to operate several wells from a single power plant or point, and it will also be understood that under certain conditions bailing is preferable to pumping.

To this end my invention consists of the employment of a novel friction clutch and brake, an operating-wheel, and a pilot, together with means for connecting the same, in combination with a source of power in continuous motion and the ordinary derricks and cables and bailers.

Figure 1:
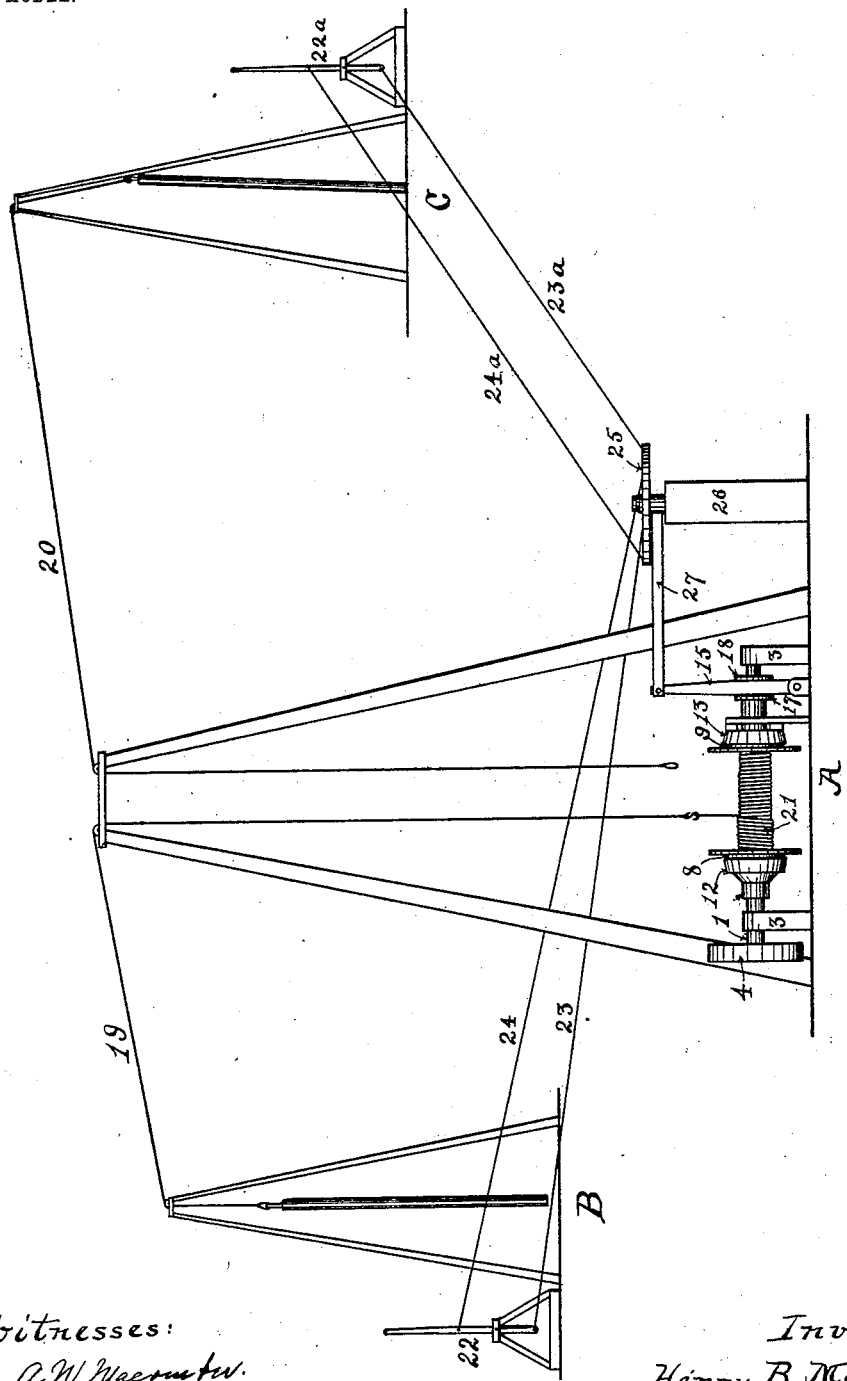
Figure 2:
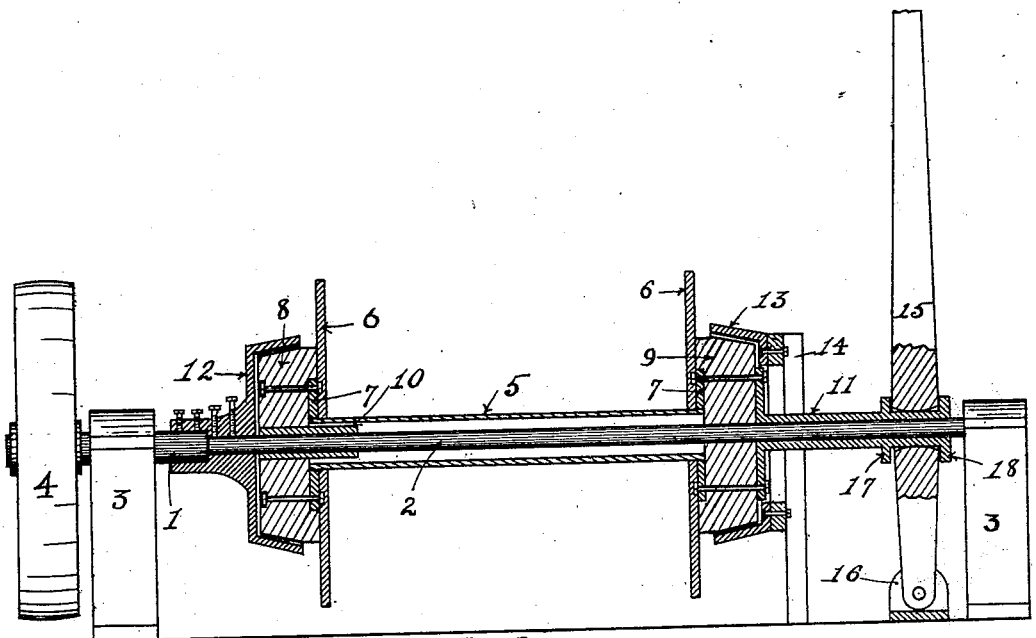
Figures 3, 4:
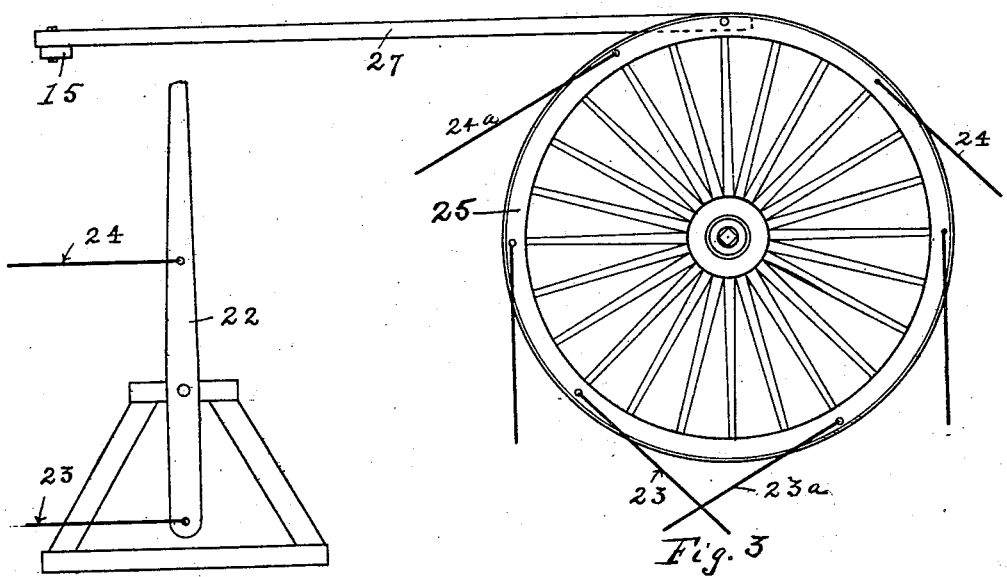

Referring to the drawings herewith, Figure 1 is a diagrammatic view showing a plurality of wells operated by my apparatus. Fig. 2 is a vertical section of my friction clutch and brake mechanism. Fig. 3 is a plan view of my operating-wheel. Fig. 4 is an elevation of my pilot.

Referring first to Fig. 2, I will explain my friction clutch and brake mechanism. 1 and 2 taken together constitute the driving-shaft, the two shafts being preferably held to rotate in common by set-screws or feathers in the hub of the cup 12. This is a convenient form of construction; but it is evident that any other convenient form of union may be employed. Of course when the engine or other source of power is directly coupled to the apparatus no coupling is necessary. 3 3 are the bearings for the shafts 1 and 2. 4 is a pulley or other desired means for communicating motion from the source of power. Mounted over the shaft 2 is a drum 5 with end flanges 6. To the ends of the drum 5 are rigidly secured flanges 7. To the flanges 7 are rigidly secured wood friction-cones 8 and 9. The cone 8 is provided with a sleeve-bearing 10, which constitutes one bearing for the drum 5, and the cone 9 is provided with an external flange and sleeve-bearing 11, which constitute the other bearing for the drum 5. It will now be seen that the drum 5 is free to revolve upon the shaft 2 or to move axially thereon. 12 is a friction-cup rigidly secured to the driving-shafts 1 and 2 and capable of engagement with the cone 8. 13 is a friction-cup capable of engagement with the cone 9. The cup 13 is mounted upon and held against rotation by a standard 14. 15 is a lever pivoted to a fixed bracket 16 and engaging over the sleeve 11 and within collars 17 and 18. It will now be seen that if the lever 15 is forced against the collar 17 the drum 5 will be moved axially and the cone 8 will engage frictionally with the cup 12. This will cause the drum 5 to revolve with the shaft 2. If the lever 15 is forced against the collar 18, the drum 5 will be moved axially in the opposite direction and the cone 8 will move out of engagement with the cup 12. In this middle position the drum 5 will be at rest. If the lever 15 is further forced against the collar 18, the cone 9 will be carried into engagement with the cup 13, which will tend to hold the drum 5 against rotation in either direction.

The devices of Figs. 3 and 4 will be readily understood without special description.

Referring now to Figs. 1, 3, and 4, I will describe the general combination and apparatus. A represents diagrammatically a derrick erected over the friction clutch and brake mechanism above described. B represents one oil-well at some distant point of the field, and C represents another well at another distant point. Only two wells are shown; but all the wells of a given field may be thus operated. The usual derricks are of course erected over each well. A bailing-cable 19 passes over a pulley at the top of the derrick of the well B and thence over a pulley on the derrick at the source of power A. A similar cable 20 extends in like manner from well C. Suppose it is desired to bail well B. The cable 19 is coupled or hooked to a cable 21, secured to the drum 5. Adjacent to the well B is a pilot 22, which consists of a lever pivoted to a frame or jack and from which extend two well-wires 23 and 24, which extend to and connect with the operating-wheel 25, which is mounted upon a post 26, set near the derrick A. These wires 23 and 24 are connected to the wheel 25 diametrically opposite each other. Pivoted to the wheel 25 is a connecting-rod or pitman 27, which is also pivoted to the lever 15. Assuming the bailer about to be lowered in the well and the cable 19 hooked to cable 21, the operator throws the pilot 22 in the direction to draw the wire 24. This rotates the wheel in the direction to force the rod 27 to the right in the drawings, and consequently to force the lever 15 against the collar 18. This, as we have seen, throws the drum 5 into frictional contact with cup 13 and will unwind the cable 19, thus lowering the bailer into the well B. In the reverse operation the pilot 22 draws the wire 23, moves the lever in the opposite direction, puts the cone 8 against cup 12, and winds the cable on the drum, thus raising the bailer. If for any reason the bailer binds or catches in the well, the connection with the source of power being a frictional contact under control of the operator at the well danger of rupturing cable 19 is avoided. The hoisting may be stopped at any time by movement of the pilot 22. In lowering the bailer to prevent a too rapid fall a brake is necessary. The pilot 22 is forced in the direction which will produce strain on the wire 24. This will rotate the wheel 25 in the opposite direction and lever 15 will be forced against collar 18. As seen, this will force cone 9 into engagement with cup 13, and rotation of drum 5 will be retarded or entirely stopped, according to the amount of friction applied.

In order to operate well C, all that is necessary to do is to connect the cable 21 with the cable 20 instead of 19. A pilot 22ª stands adjacent to well C, and wires 23ª and 24ª connect it with the wheel 25. The operation is identical with that just described.

It will thus be seen that the number of wells which may be bailed from a single source of power is practically unlimited in a given field and that the entire control is in the hands of the operator at the well.

Having thus described my invention and its method of operation, what I claim is—

1. In combination with a plurality of bailers and well-cables and a pilot adjacent to each bailer and mechanism connecting each pilot mediately with a friction-clutch and a friction-brake, mechanism for raising and lowering the bailers comprising a driving-shaft in continuous rotation, a drum mounted upon said driving-shaft and free to move in rotation and axially on said driving-shaft, a friction-clutch having one member secured to said driving-shaft and the other member secured to said drum, a friction-brake having one member secured to said drum and the other member externally and rigidly mounted, and means for moving said drum axially from points adjacent to the several bailers, whereby said drum may be rotated by said friction-clutch to lift a bailer and whereby said drum may be governed by said friction-brake to lower a bailer, substantially as and for the purposes set forth.

2. In combination with a plurality of "bailers" and well-cables, a drum for raising and lowering the "bailers," means for connecting the cables to said drum, a friction-clutch and a friction-brake on said drum, a pilot adjacent to each "bailer" and mechanism connecting each pilot with said friction-clutch and friction-brake, whereby a plurality of wells may be bailed by a single source of power, substantially as and for the purposes set forth.

3. In combination with a plurality of "bailers" and well-cables, a drum for raising and lowering the "bailers," means for connecting said cables to said drum, a friction-clutch and a friction-brake on said drum, a pilot adjacent to each "bailer," an operating-wheel, well-wires connecting each of said pilots with said operating-wheel, and connecting mechanism between said operating-wheel and said friction-clutch and friction-brake, whereby any well-cable may be connected with said drum and whereby the operation of bailing any well may be controlled by the operator at the well, substantially as and for the purposes set forth.

In witness whereof I have hereunto set my hand in the presence of two witnesses.

HENRY B. MARTIN.

Witnesses:
EDWARD C. RISCHMAN,
JOSEPHINE S. BERTSCH.